(12) United States Patent
Kross

(10) Patent No.: US 6,664,301 B1
(45) Date of Patent: Dec. 16, 2003

(54) METHOD FOR USING GLYCOL ADDITIVES TO TEXTURALLY MODIFY NATURAL GUM HYDROGELS

(76) Inventor: Robert D. Kross, 2506 Florin Ct., Bellmore, NY (US) 11710

( * ) Notice: Subject to any disclaimer, the term of this patent is extended or adjusted under 35 U.S.C. 154(b) by 0 days.

(21) Appl. No.: 10/079,953

(22) Filed: Feb. 20, 2002

(51) Int. Cl.$^7$ .............................. B01J 13/00; C08J 3/05; C08L 1/28; C08L 5/00
(52) U.S. Cl. .................. 516/105; 106/205.72; 514/780; 514/944; 516/106; 516/107
(58) Field of Search ................................ 516/105, 106, 516/107; 106/205.72; 514/780

(56) References Cited

U.S. PATENT DOCUMENTS

| | | | | |
|---|---|---|---|---|
| 3,944,427 A | * | 3/1976 | Sullivan, Jr. | 516/107 X |
| 4,178,264 A | * | 12/1979 | Streit et al. | 516/107 |
| 4,291,025 A | * | 9/1981 | Pellico | 516/105 X |
| 4,299,231 A | * | 11/1981 | Karmann et al. | 516/107 X |
| 4,427,681 A | * | 1/1984 | Munshi | 516/105 X |
| 4,466,890 A | * | 8/1984 | Briscoe | 516/107 X |
| 4,734,132 A | * | 3/1988 | Yoshida | 516/105 X |
| 4,772,324 A | * | 9/1988 | Porteous et al. | 106/205.72 X |
| 5,308,546 A | * | 5/1994 | Hansen et al. | 106/205.72 X |
| 5,785,747 A | * | 7/1998 | Vollmer et al. | 106/205.72 X |
| 5,858,380 A | * | 1/1999 | Gagnebien | 514/780 X |
| 6,387,169 B1 | * | 5/2002 | Cordova | 106/205.72 X |

\* cited by examiner

Primary Examiner—Richard D. Lovering
(74) Attorney, Agent, or Firm—Edwin D. Schindler

(57) ABSTRACT

A method for strengthening a hydrogel of a naturally-occurring gelling agent, or a derivative thereof, including the step of adding at least one glycol to the gelling agent of the general formula:

$$HO-(CH_2)_n-OH,$$

$$HO-(CH_2-CH_2O)_x-H,$$

$$HO-(CH_2-CH_2-CH_2O)_y-H; \text{ and,}$$

$$HO-(CH_2-CH[CH_3]-O)_y-H,$$

in which,
n is from 2 to about 8;
x is from 6 to about 30; and,
y is from 4 to about 20.

Also useful of those of the general structure:

$$HO-[C(R^1)(R^2)-C(R^3)(R^4)]-OH,$$

in which,
$R^1$, $R^2$, $R^3$, $R^4$ are capable of being —H in all four positions,
or H in 0, 1, 2, 3 positions and —CH$_3$ or —C$_2$H$_5$ in any or all of the non-H occupied positions.

Further, 1,2-propylene glycol and its ether derivatives, having only secondary alcohol groups, are particularly useful, having the general structure:

$$R^5O-CH_2-CH(CH_3)-OR^6,$$

in which,
either or both $R^5$ and $R^6$ are H or —CH$_2$—CH(OH)—CH$_3$.

24 Claims, No Drawings

METHOD FOR USING GLYCOL ADDITIVES TO TEXTURALLY MODIFY NATURAL GUM HYDROGELS

BACKGROUND OF THE INVENTION

1. Technical Field of the Invention

The present invention relates, generally, to a method for the use of glycol additives in natural gum hydrogels.

More particularly, the present invention concerns the inclusion of glycols in hydrogel formulations to enhance the strength of the gels and reduce the tendency for syneresis.

2. Description of the Prior Art

It is well known that while certain polysaccharide gums can be used to form gels, others will not form gels individually. However, certain combinations of polysaccharide gums have been found to form gels even though one or more of the gums will not form a gel on its own.

A synergistic effect has been found with certain polysaccharide gums, whereby the addition of a non-gelling gum to a gelling gum results in a significant increase in gel strength. Gels can also be produced from certain combinations of gums, even where none of the individual gums will form gels. In this manner, combinations of polysaccharide gums, or polysaccharide gums with other gelling agents, can produce gels with desirable textures and/or strength. Carob gum, will not gel on its own, but in combination with agar or carrageenin, will produce a much stronger and more elastic gel than is otherwise obtained from agar or carrageenan alone. Moreover, xanthan gum, which will not form a gel on its own, but in combination with certain galactomannan gums, such as carob, tara and cassia gums (which will also not form gels on their own), nevertheless produces useful gels. Glucomannan gums will produce thermo-irreversible gels under strongly alkaline conditions. In combination with xanthan gum, however, strong thermoreversible gels can be produced under acid to neutral conditions.

It has also been observed in the literature that combinations of gellan with small amounts of other gums, such as xanthan, guar or carob gum, will reduce syneresis in a gel, but no marked improvement in the strength or texture of the gel is observed.

U.S. Pat. No. 4,517,216 (Shim), the disclosure of which is hereby incorporated by reference, discloses that the only gelling agent that produces any synergistic improvement in gel strength, when used in combination with gellan, is gelatin. This prior art patent discloses that many gelling agents were tested by the patentees, in combination with gellan, in an attempt to achieve a synergistic increase in gel strength, including carrageenan, carob gum, sodium alginate, corn starch and pectin. Of these only carrageenan provided a small increase in gel strength, but this was considered to be primarily because of the presence of various salts in the carrageenan affecting gelling of the gellan, rather than the carrageenan itself. All of the other agents tested reduced gel strength. Moreover, the effect with gelatin was only noticed with low acetyl gellan. Gums obtained from natural sources, be they botanical or bacterial in origin, are generally characterized as polymers of five- or six-carbon chain sugar monomers, linked to each other by oxygen bridges derived from alcohol oxygens on the respective monomeric sugars. The sugars themselves, be they glucose, mannose, xylose, galactose, or the like, are generically classified as polyols or polyhydric alcohols, which are multicarbon aliphatic molecules containing three or more alcohol (i.e. —OH) groups. When a molecule contains but two such —OH groupings, it is termed a glycol.

It is presumed that the ability of certain gums to form gels with other gums, while themselves being individually incapable of doing so, relates to the particular steric conformation of the monomeric sugar components of the chain, and their spacial contiguity with sugar moieties of adjacent sugar polymer chains. The close approach of the two units could lead to the formation of so-called "hydrogen bonds" between the —OH groups of these units, which would result in a stabilization of the hydrated gum mass into a solid or semi-solid structure, rather than the original freer-flowing liquid. Hydrogen bonds, by convention, are not actual chemical bonds within a single molecule but are electrostatic attractions between adjacent molecules, where one atom or functional group in one molecule, with a relative deficiency of electrical charge, is attracted to an atom or functional group with a high localization of electrical charge in another. Hydrogen bonding, for example, is responsible for the liquid structure of water, where the hydrogen, "H," of an "O—H" (in $H_2O$, or H—O—H) of one molecule is attracted to the negatively-rich oxygen, "O" of an adjacent H—O—H molecule. Without such intermolecular attractions, the small $H_2O$ molecule would certainly be a gas, rather than a liquid.

In contrast, a non-gelling gum, which may have more or less aligned chains in the aqueous solution, could not form such intermolecular bonding, and thus not orient itself into three-dimensional structures. However an aqueous combination of different sugar polymer structures could well allow for the interchain weaving, and attractions characteristic of the hydrogels.

In an effort to strengthen certain hydrogel combinations being investigated by prior art artisans, and to possibly reduce the syneresis common to many of the gels being investigated, it seemed to logically follow for the skilled artisan to consider the use of non-sugar glycols and polyols as additives to effect a strengthening of a weaker hydrogel structure. A molecule with at least two alcoholic groupings, i.e., two "—OH" groups, could theoretically simulate the action of sugars, where one of the OH's would be attracted to a potential hydrogen-bonding site on one sugar chain, while the other would be attracted to a similar site on an adjoining chain. Were this to happen, the entire gel structure might be firmed up.

In reviewing the prior art for such use of glycols and polyols in connection with hydrogels, mention has been made of the well-known use of glycerin, and related multi-hydroxy compounds, such as pre-"wetting" agents of gum powders, prior to exposure to water. Such use allows for a much easier dispersion of most solid gum powders in water, since the initial contact of a gum powder mass with water can often lead to a gummy surface on the mass through which additional water cannot easily penetrate, so as to hydrate the balance of the powder. Indeed the prior art has often taught the use of small quantities of simple alcohols (e.g. isopropanol) or glycerin as an initial dispersant of thickening agents or gums.

U.S. Pat. No. 4,457,908, for example, discloses the use of glycerin as an initial dispersant of the carrageenan gellant in formulating a toothpaste formulation, which is thereafter stabilized by exposure to microwave radiation.

U.S. Pat. No. 4,318,746 teaches the use of an electrolyte for increasing the rigidity or conductivity of mixed polymers, such as those of kappa carrageenan and hydroxy-propylmethylcellulose, and suggests that, if desired, glycerol (glycerin), propylene glycol or other polyhydric alcohols may be used to reduce the rate of evaporation (of water) from the gel. No teaching or suggestion, however, is made to the possible role of such alcohols as firming or strengthening agents.

U.S. Pat. No. 5,002,934, similarly, makes reference to a skin-moisturizing carrageenan gel containing 1% glycerol; a common use of this polyhydric alcohol in the cosmetic field. Glycerin is also recommended for use as a plasticizer for dried films created from two gums, konjac and agar, and gelatin, but, again, is not associated with strengthening effects. In a similar vein, The FMC BioPolymer Company recommends the use of glycerin as a 1%-component of water in which to dissolve its konjac flour, wherein the glycerin serves as a plasticizer.

A similar application, as a plasticizer, is referenced in U.S. Pat. No. 5,543,164, wherein glycerol, sorbitol or polyethylene glycol is included in a food product coating.

In all of these prior art teachings, no reference is made to the use of glycols or polyols with respect to their possible use for gel firming or strengthening. Where alcohols other than glycerin are referenced, they are disclosed as a group of monohydric or polyhydric alcohols, including sugars, for retarding the setting of shaped solid food products based on alginates, where the alcohol may be isopropyl alcohol, glycerol, propylene glycol or butylene glycol.

An investigation was begun to evaluate the result of adding a variety of glycols, at various levels, to the hydrogels being studied, to determine if the multihydroxy compounds could affect the structural integrity of the resulting gels. Encouragement was found for this approach in U.S. Pat. No. 4,369,125, which taught that the preliminary deacetylation of xanthan gum unexpectedly led to much stronger hydrogels than could be otherwise obtained. Xanthan is a polysaccharide which is an acetyl ester of a mixed polymer containing mannose, glucose and a glucuronate salt. The elimination of an acetyl group results in a structure with more available —OH groups for intermolecular bonding. An apparent counter tendency was disclosed, however, in U.S. Pat. No. 4,096,327, where the replacement of —OH groups, on the sugar chain, by hydroxyalkyl groups in carrageenan leads to a gel with decreased stiffness and decreased syneresis. In this case, however, there is no overall increase in hydroxyl functions, but a lengthening of the molecular moieties which hydrogen bond to adjacent chains; so increased flexibility would be expected.

The present invention is, therefore, the result of a search for methods to enhance or modify the strength of hydrogels comprised of natural carbohydrate-based gums through an alternate pathway to those currently available. The latter include metal cation augmentation, change of pH, deacetylation and hydroxyalkylation of sugar moieties, and variation in the nature and balance of the multiple gums which comprise the hydrogel. All of these methods were deemed to be insufficient to produce the types of shaped hydrogel products being sought by the inventor. The approach has been to provide supplemental hydroxyl-functionality to the hydrogels, facilitating intermolecular bonding by employing non-sugar hydroxyl compound additives. Specifically the strategy was based on the wide diversity of molecular shapes and sizes associated with dihydroxyalkanes, termed glycols, which are commercially available in relatively pure form. A systematic study of their effects, as additives in hydrogels, has led to unexpected improvements in the physical characteristics of the gels, and has, in turn, led to the product qualities being sought.

SUMMARY OF THE INVENTION

It is, therefore, an object of the present invention to provide a method for strengthening hydrogels of naturally-occurring gelling agents, and chemical derivatives thereof, by selective incorporation of glycols therein.

A further object of the present invention is to correlate the nature of specific glycols and the structural impact on the hydrogel compositions in which they are incorporated.

It is, yet, an additional object of the present invention to correlate the use level of specific glycols and the structural impact on the hydrogel compositions in which they are incorporated.

A further object of the present invention is to provide a method for optimizing the intended composition of the glycol-containing hydrogel so as to best suit the intended use of the resulting product.

It is a general object of the present invention to substantially alleviate the above-identified deficiencies inherent in prior art methods.

The foregoing and related objects are achieved by the method of the present invention for preparing strengthened hydrogels of naturally-occurring gelling agents, and chemical derivatives thereof, by the inclusion of specific glycols and mixtures thereof in the pre-gelled mixture from which the hydrogel is thereafter produced.

Another related feature of the method of the present invention provides for the selective use of individual glycols and combinations thereof, in combination with hydrogel precursor agents, based on the molecular structure of at least one glycol and the nature of the gelling agent, or gelling agents, with which they are combined. Glycols which have been found to strengthen hydrogels are those of the general structure of:

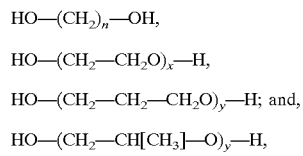

wherein,
  n is from 2 to about 8;
  x is from 6 to about 30; and,
  y is from 4 to about 20.
Also useful of those of the general structure:

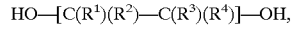

wherein,
  $R^1$, $R^2$, $R^3$, $R^4$ are capable of being —H in all four positions,
    or H in 0, 1, 2, 3 positions and —$CH_3$ or —$C_2H_5$ in any or all of the non-H occupied positions.
  1,2-propylene glycol and its ether derivatives, having only secondary alcohol groups, are particularly useful, having the general structure:

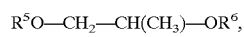

wherein,
  either or both $R^5$ and $R^6$ are H or —$CH_2$—CH(OH)—$CH_3$.

Usage levels of these glycols are generally in the range, by weight percent, from about 0.1% to about 45%, preferably of about 0.25% to about 25%, and most preferably from about 1% to about 20%.

In a preferred embodiment, the method of the present invention provides for identifying appropriate use levels of individual glycols and combinations thereof, in combination with hydrogel precursor agents, so as to achieve a gel structure appropriate for the intended use of the hydrogel.

In a particularly preferred embodiment, a hydrogel comprising polyethylene glycol (400), konjac flour, xanthan gum, carrageenan gum, carob gum, dextrose, malic acid and water is used in the form of a mask to cover the peripheral areas of the eye, and hydrate the underlying skin. In a further embodiment, a hydrogel comprised of a mixture of konjac, xanthan and carrageenan gums, lanolin and octyldodecanol is formulated for use as a topical pad to ameliorate dry skin area.

These and other aspects of this invention will become evident upon reference to the following detailed description.

Other objects and features of the present invention will become apparent when considered in combination with the following detail description of the invention, which provides certain preferred embodiments and examples of the present invention. It should, however, be noted that the accompany detailed description is intended to discuss and explain only certain embodiments of the claimed invention and is not intended as a means for defining the limits and scope of the invention.

DETAILED DESCRIPTION OF THE PREFERRED EMBODIMENTS

Glycols, which may be used in connection with the present invention, are combined with a variety of dry, hydrophilic gelling agents, singly or in combination, prior to hydration, heating and cooling to set the gel structures. The heating process required to set the gel, and the appropriate temperatures therefor, are characteristic of the particular hydrogel powders being used, and are well known to those skilled in the production of hydrogels.

The gelling agents include such materials as, e.g., carrageenan, xanthan gum, locust bean gum, konjac flour, starch, methyl and ethyl cellulose and related cellulosics, partially- or fully-deacetylated gellan, carob gum and agar. Generally, the glycols are not capable of creating gels from individual or mixed carbohydrate polymers, which themselves would gel, but they can play a significant role in adding structural integrity when included in the formulation of those that can. The glycols are generally stable in the presence of a variety of materials, which are often included in gels, such as salts, stabilizers, preservatives and colorants.

It is additionally advantageous to employ the glycols, being liquids, as initial dispersants of the powdered gellants, to avoid the addition of water directly to the powders which commonly causes clumping and difficulty in hydration, even with heating. Saturating the powders with the glycol first, allows for the more ready dispersion of the "wet" powder prior to water contact, where the water subsequently diffuses into the powder as it slowly displaces the glycol. When additional materials, which have beneficial skin properties, are intended to be a part of the hydrogel formulation, they are then added to the powder/glycol dispersion prior to the addition of the water. The glycol type and level thereof are selected to optimize the balance between ultimate gel strength and desired clarity of the hydrogel. Longer chain glycols tend to favor the solubilization of lipid-like materials, particularly at levels at or above about 1 percent of the final gel composition. Shorter-chain glycols are favored for more polar materials. While ethylene glycol and shorter chain ethers thereof are disfavored, because of their toxicological concern, and negative impact on structure at higher levels of inclusion, the longer chain polyethylene glycols have particular value.

The preferred range of polyethylene glycols are of the general formula $HO-(CH_2O)_n-H$, wherein n is an integer of 6 to 30. At the higher values for n, the structural integrity of the hydrogel is diminished. It has also been generally found that the longer chain glycols result in a thinner-pouring and more manageable hydrogel, when the mixed components are heated to the desired temperature as part of the hydrogel-forming process.

Propylene glycol (1,3-propanediol), per se, is toxicologically innocuous, and is a preferred hydrogel-strengthening agent as well as an effective dispersant for the hydrogel powders. Also preferred are the several isomers of dipropylene glycol, the diethers of propylene glycol, an methyl-substituted dipropylene glycols, such as 2-methyl-1,3-propanediol (MPDiol) and 1,1,3,3-tetramethyl-1,3-propanediol ("hexylene glycol").

A variety of additional materials may be included in the hydrogel structures created by this inventive process. Such additional materials include stabilizing salts, surface active agents, a variety of agents imparting beneficial properties to skin, colorants, fragrances, opacifiers, pH-modifying agents, solubilizers and preservatives. The stabilizing salts, and their levels of use, are well known to those skilled in the art for the particular hydrogel powders involved, including alkali- and alkaline-earth salts, such as potassium and calcium salts. Surface active agents can include the non-ionic, cationic, anionic and amphoteric agents, with the non-ionic surfactants generally favored. Their level of use can be readily determined by practitioners in the field, in order to accomplish their intended benefit of facilitation of solubilization of beneficial skin agents. Additional solubilizing agents can be used, specific for the beneficial skin agent to be incorporated. Such solubilizers can range from monohydric alcohols, such as isopropanol, to lipid-compatible agents such as mono- and diglycerides. Their level of use will be dictated by the nature and level of the skin agent, and can be readily determined by those skilled in the art.

The materials useful for pH modification, generally to bring the hydrogel to the acidic side, are acids and acidic salts (e.g., zinc chloride, aluminum chlorhydroxide). The acids are, preferably, of the alpha-hydroxy class, such as citric, malic and tartaric acids. In a preferred embodiment the alpha-hydroxy acids are lactic, glycolic and mandelic acids, which are also well-regarded for their use as skin debriding agents. Salicylic acid, which also is a skin exfoliant, though not an alpha-hydroxy acid, is also a preferred component. When these materials are used as skin exfoliating agents, as well as for adjustment of the gel pH, they are generally used at higher levels than that required for pH reduction alone. Those levels may range up to about 10% by weight, and when so used they are provided as a bufering mixture, e.g., glycolic acid plus sodium glycolate, to maintain the gel pH's in the range from about 2.5 to about 5.0.

Those compounds which may be included in the inventive gel structures, individually or in combination, can generally be categorized as those that benefit the human body, particularly the skin, in the following representative areas: Anti-wrinkling, anti-aging, skin-repair, moisturization, hydro-regulation, softness, metabolic activation, skin nutrition, skin protection, skin soothers, anti-irritants and agents for sensitive skin, anti-free radical agents, firming agents and osmo-regulators, immuno-regulators, sebaceous-gland regulators, antimicrobials, skin lightening, exfoliaters and sun-care agents. These materials include, but are not limited to; plant and herbal extracts such as derived from aloe vera and calendula, respectively; vitamins such as Vitamins C, E and K; animal products such as hydrolyzed collagen and royal jelly; sun-block agents; amino acids and peptides; lipids such as tea tree oil and octyldodecanol; seed oils, such as those derived from canola, grapeseed, safflower, sunflower, castor bean and jojoba; silicones such as dimethicone copolyol phosphate; cooling agents such as camphor and menthol; and, enzymes such as lipases and proteases.

Their levels of use in the hydrogels are related to a variety of factors, and generally fall in the range of about 0.2% to about 25%, and preferably from about 0.5% to about 10%. The glycol or glycol mixture required to facilitate the inclusion of these materials in the hydrogel depends on the nature and quantity of material intended to be a component. In general, more polar components are more effectively dispersed through the use of more polar glycols, such as propylene- and dipropylene glycol, while more lipid-like materials generally favor the use of longer and less-polar glycols such as the polyethylene glycols, hexylene glycol and methyl propanediol. In general the appropriate glycol, or glycol mixture that is most effective is that which readily disperses the powdered gums and the additional agents such as described above, when such are included in the hydrogel, and provides an ultimate hydrogel of the desired structural integrity. It is also advantageous to select a glycol or glycol combination, and a usage level thereof, that yields an easy-to-pour hot gel, prior to removal of the processed combination from the heat source, to facilitate transfer of the hot mixture into the thermoformed shapes, in which the hydrogel mixture will cool and assume the shape thereof, or when spreading on a moving belt while a doctor blade forms a continuous hydrogel sheet of the desired thickness.

The present invention is illustrated by the following examples. Unless otherwise noted, all parts and percentages in the Examples as well as this disclosure and claims are by weight.

EXAMPLE 1

This example shows the strengthening effect of dipropylene glycol (2,2'-dihydroxydipropyl ether) ("DPG") on a hydrogel based on a mixture of konjac flour, xanthan gum, dextrose, carrageenan and locust bean gums. Three formulations were prepared in which such combination represented 2.30% of the final hydrogel, which also contained 0.80% calcium lactate and Surcide DMDMH preservative at 0.75%. Formulation No. 1 contained 8.0% of DPG and 5.5% of glycerine, for a total of 13.5% of polyhydric alcohols. Formula No. 2 contained 13.5% of just DPG alone, and Formula No. 3 contained 20.0% of DPG alone. Water made up the balance of the formulation.

The gels were prepared in identical manners, wherein the powdered mix was initially dispersed in the liquid mix comprised of alcohol and preservative, and the requisite amount of water added to bring it to 100%. After thorough mixing, the liquid was heated in a microwave oven, with intermittent mixing, to a final temperature of 82°–85° C. The fluid mixture was then poured into two Pyrex dishes (155× 10 mm), covered, and allowed to cool and set. After cooling, a 20.0-gram portion of the solid gel was placed in a separate dish, covered, and then heated in an autoclave to 250° F. to re-melt the product and eliminate air bubbles. The cooled product, representing identically-sized discs, was then evaluated for strength in the following manner. The disc was mounted on the bed of a Chatillon LTCM-6 strain gauge, and a ¾-inch diameter plate was placed on it at one of five annular positions, for serial quintuplicate pressure measurements. The measurement was carried out by depressing the plate into the gel, at the slowest speed of the instrument, such that it slowly penetrated into the hydrogel over a 10-second period. The peak pressure required to depress the plate into the gel, after precisely 10 seconds, was measured in quadruplicate, and the average value (in lbs.), then calculated.

Results:

EFFECT OF INCREASING DIPROPYLENE GLYCOL(DPG) LEVELS ON THE STRENGTH* OF HYDROGELS

| Disc | DPG % | Glycerine % | Pressure (lbs) | Increase % vs. Control |
|---|---|---|---|---|
| A | 8.0 | 5.5 | 0.99 | - - - |
| B | 13.5 | - - - | 1.17 | 18% |
| C | 20.0 | - - - | 1.36 | 37% |

*Peak pressure, in lbs. to depress 3/4-"diameter plate" into 1/8-inch gel, over a 10-sec. period.

It is apparent from these data that the replacement of the 5.5% glycerin, an often recommended dispersal agent, with an equal weight of dipropylene glycol brings about a significant increase in the depressive strength of the hydrogel and, further, the addition of approximately 50% more DPG (as of the amount in Disc B) causes a comparable further increase in the depressive strength of the hydrogel.

EXAMPLE 2

This example shows the strengthening effect of PEG-400, a polyethylene glycol with a molecular weight of approximately 400, of average formula HO—(CH$_2$—CH$_2$—O—)$_{8.7}$—H, as a function of increasing levels in the base formula given in Example 1, and prepared and evaluated in an identical manner. The same levels of the PEG-400 were used as those of DPG in Example 1, which allows for a comparison of the effects of the two glycols. It should be noted that the —OH function represents a much smaller fraction of the PEG-400 molecule than in the DPG molecule, and yet the effect of the PEG-400 is significantly greater, up to a point.

Results:

EFFECT OF INCREASING PEG-400 LEVELS ON THE STRENGTH OF HYDROGELS

| Disc | PEG-400% | Glycerine % | Pressure (lbs) | Increase % vs. Control |
|---|---|---|---|---|
| D | 8.0 | 5.5 | 1.54 | - - - |
| E | 13.5 | - - - | 1.93 | 25% |
| F | 20.0 | - - - | 1.09 | −29% |

The PEG-400 causes a very significant increase in depressive pressure up to the 13.5% level and then a decrease thereafter. Its effect is that much greater than an equal weight of DPG, in the lower of the two levels of addition, as can be seen in the following comparison of the two sets of data. In the table, a data point is included on a comparable hydrogel, in which only glycerin has been used as the dispersant. The force data are compared with that of the latter gel, as Control.

| | COMPARISON OF THE STRENGTHENING EFFECTS OF DPG & PEG-400 | | | | |
|---|---|---|---|---|---|
| Disc | DPG % | PEG-400 % | Glycerine % | Pressure (lbs) | % Increase vs. Control [G] |
| A | 8.0 | — | 5.5 | 0.99 | 2 |
| D | — | 8.0 | 5.5 | 1.54 | 59 |
| B | 13.5 | — | — | 1.17 | 21 |
| E | — | 13.5 | — | 1.93 | 99 |
| C | 20.0 | — | — | 1.36 | 40 |
| F | — | 13.5 | — | 1.09 | 12 |
| G | — | — | 5.5 | 0.97 | [Control] |

This set of data shows that PEG-400, at comparable lower levels of inclusion in the standard gel formulation, provides a much greater impact on gel texture than does the DPG. At the higher level of inclusion, the effect is reversed, i.e., the DPG becomes more effective. These data suggest that an ever higher level of DPG would result in greater firmness, whereas the opposite effect is anticipated for the PEG-400.

EXAMPLE 3

This example shows the difference in hardening effect of propylene glycol (PG) and dipropylene glycol (DPG), the latter being the di-ether of the former compound. The data from Example 1 on DPG are included for comparison. The PG hydrogels were produced in an identical manner to that provided in Example 1, using the same combination of gelling agents, water and preservative. Only the amount of glycol was varied, as was the level of water to accommodate the changes in glycol levels.
Results:

| | COMPARISON OF THE STRENGTHENING EFFECTS OF PROPYLENE GLYCOL (PG) AND DIPROPYLENE GLYCOL (DPG) | | | |
|---|---|---|---|---|
| Disc | PG % | DPG % | Glycerine % | Pressure (lbs) |
| H | 8.0 | --- | 5.5 | 0.97 |
| A | --- | 8.0 | 5.5 | 0.99 |
| I | 13.5 | --- | --- | 1.01 |
| B | --- | 13.5 | --- | 1.17 |
| J | 20.0 | --- | --- | 1.76 |
| C | --- | 13.5 | --- | 1.36 |

As noted for DPG, the significant increase in gel strength is most noted at elevated levels of the small PG molecule, again in contrast with the lesser effect of the higher percentage of the longer molecule PEG-400.

EXAMPLE 4

This example shows the different strengthening effects imparted to gels which are of the same composition, as prepared according to Example 1, wherein a series of glycols have been incorporated at the 20% level. The effects of molecular size and conformation of the glycol can be readily seen in the force data. What is not evident is the difference in appearance in the hydrogels, and their individual ability to facilitate the solubilization of a range of active agents, generally a series of cosmetic-related components which are generally less hydrophilic, and therefore of lower solubility in hydrogel matrices. Two series of glycols, of increasing size were investigated, i.e., selected propylene glycols and ethylene glycol polymers. Also included was hexylene glycol (tetramethyl-propylene glycol 1,3), which is a branched glycol, where the different conformation imparts different solvation properties with respect to certain lipids.

| EFFECT OF GYCOL* CHAIN LENGTH ON GEL STRENGTH** | |
|---|---|
| Glycol Series | Pressure |
| Propylene Glycol (1,3) | 1.76 |
| 2-Methyl, Propylene Glycol (1,3) | 1.21 |
| 1,1-3,3-Tetramethyl Propylene Glycol (1,3) | 1.22 |
| Dipropylene Glycol | 1.36 |
| Triethylene Glycol | 0.36*** |
| Polyethylene Glycol 200 | 0.98 |
| Polyethylene Glycol 300 | 1.11 |
| Polyethylene Glycol 400 | 1.09 |
| Polyethylene Glycol 600 | 0.91 |

*Present at 20% of the hydrogel formulation
**Peak pressure, in lbs. to depress 3/4" diameter plate 1/8" into gel, over a 10-sec. period.
***Peak pressure in approx. 7 seconds of 0.46, followed by fracture of the gel surface and pressure drop.

It is apparent that the effect of the glycol on the gel strength is a function of a number of factors, e.g. the polarity of the molecule (propylene glycol being the smallest and most polar), whether the glycol polymer is an ethylene oxide- or propylene oxide-polymer, or has a carbon backbone (as in hexylene glycol). The longer chain materials, of lower overall polarity, have a greater solubilization capacity for such lipid-like materials as lanolin esters, and therefore would be preferred agents to use in such instances, despite the greater strength imparted by the more polar glycols.

EXAMPLE 5

This example demonstrates the use of a single glycol, propylene glycol, to form a firm hydrogel while acting as an effective solvent for the alcoholic extract of calendula. A 300 gm sample of the product was created by dissolving 30.0 grams of calendula extract and 2.3 grams of the liquid dimethyl hydantoin preservative in 60.0 grams of propylene glycol. To this mixture was serially added the following powdered materials: 5.1 grams of konjac flour and 1.80 grams of carrageenan powder blends; then 0.44 grams of calcium ($Ca^{++}$) in soluble salt form, and 0.20 grams of sodium benzoate. This mixture was stirred, so as to thoroughly disperse all the materials, and 198.2 grams of deionized water was then added, sufficient to reach a 300 gm weight. The mixture was then slowly heated and stirred on a hot plate, until the temperature reached about 85° C. At that point the thickened mixture was poured into a series of 2-½-inch glass dishes to a height of about ⅜-inch each, covered, and allowed to cool. The clear discs had a good firmness of 1.18 lbs, as measured by the Chatillon LTCM-6 strain gauge procedure described in Example 1, and was suitable for skin application.

EXAMPLE 6

This example demonstrates the production of a skin-benefitting hydrogel containing lanolin and octyldodecanol at the 1% and 2% levels, respectively. In this example a mixture of two glycols is utilized, propylene glycol and polyethylene glycol 400. A 300-gm sample was prepared by first dissolving 6.0 grams of the octyldodecanol, 6.0 grams of mixed coco-triglycerides and 3.0 grams of U.S.P. Lanolin, and 2.3 grams of dimethyl-hydantoin preservative into 30 grams each of the propylene glycol and the PEG 400. Following dissolution, the three powdered gel agents were added in the following amounts: 5.1 grams of konjac flour, and 1.8 gms of carrageenan powders. Thereafter, 0.44 grams of calcium ($Ca^{++}$) in soluble salt form, 1.1 grams of malic acid, and 0.2 grams of sodium benzoate were weighed into the liquid, which was then stirred to a uniform slurry. Deionized water was then added, to a total weight of 300 grams, and the entire mixture stirred to uniformity. The mixture was then slowly heated and stirred on a hot plate, until the temperature reached about 85° C. At that point, the thickened mixture was poured into large rectangular glass dish to a height of about ¼-inch, covered, and allowed to cool. The cooled sheet was cut into 2-inch squares, and used to ameliorate dry skin conditions.

While only several embodiments of the present invention have been shown and described, it will be obvious to those skilled in the art that many modifications may be made to the present invention without departing from the spirit and scope thereof.

What is claimed is:

1. A method for strengthening a hydrogel of a naturally-occurring gelling agent, or a derivative thereof, comprising the steps of:

providing a gelling agent selected from the group consisting of xanthan gum, konjac flour and a combination thereof;

hydrating said gelling agent;

adding a glycol to said gelling agent, said glycol being a member selected from the group consisting of:

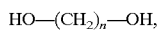

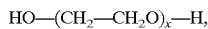

a combination thereof, wherein, n is from 2 to about 8;

x is from 6 to about 30; and, y is from 4 to about 20, to produce a hydrogel mixture;

heating said hydrogel mixture; and, returning said hydrogel mixture to ambient temperature, thereby producing a strengthened hydrogel.

2. The method according to claim 1, wherein said gelling agent is a hydrogel precursor agent selected to achieve a gel structure appropriate for an intended use of said strengthened hydrogel.

3. The method according to claim 1, wherein said glycol constitutes about 0.1% to about 45%, by weight, of said strengthened hydrogel.

4. The method according to claim 3, wherein said glycol constitutes about 1% to about 20%, by weight, of said strengthened hydrogel.

5. The method according to claim 1, wherein said gelling agent further includes a member selected from the group consisting of carrageenan, locust bean gum, starch, a cellulosic, partially- or fully-deacetylated gellan, carob gum, agar and a combination thereof.

6. The method according to claim 5, wherein said cellulosic is a member selected from the group consisting of methyl cellulose, ethyl cellulose and a combination thereof.

7. The method according to claim 1, wherein said glycol is a member selected from the group consisting of propylene glycol (1,3-propanediol), an isomer of dipropylene glycol, a diether of propylene glycol, and a methyl-substituted dipropylene glycol and a combination thereof.

8. The method according to claim 7, wherein said methyl-substituted dipropylene glycol is 2-methyl-1,3-propanediol (MPDiol), 1,1,3,3-tetramethyl-1,3-propanediol (hexylene glycol) and a combination thereof.

9. The method according to claim 1, wherein said step of returning said hydrogel mixture to ambient temperature is carried out by allowing said hydrogel mixture to cool without refrigeration means.

10. The method according to claim 1, wherein said step of returning said hydrogel to ambient temperature is aided by utilizing refrigeration means.

11. A method for strengthening a hydrogel of a naturally-occurring gelling agent, or a derivative thereof, comprising the steps of:

providing a gelling agent selected from the group consisting of xanthan gum, konjac flour and a combination thereof;

hydrating said gelling agent;

adding a glycol to said gelling agent, said glycol being a member selected from the group consisting of:

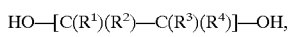

wherein, $R^1$, $R^2$, $R^3$, $R^4$ are capable of being —H in all four positions, or H in 0, 1, 2, 3 positions and —$CH_3$ or —$C_2H_5$ in any or all of the non-H occupied positions to produce a hydrogel mixture;

heating said hydrogel mixture; and, returning said hydrogel mixture to ambient temperature, thereby producing a strengthened hydrogel.

12. The method according to claim 11, wherein said gelling agent is a hydrogel precursor agent selected to achieve a gel structure appropriate for an intended use of said strengthened hydrogel.

13. The method according to claim 11, wherein said glycol constitutes about 0.1% to about 45%, by weight, of said strengthened hydrogel.

14. The method according to claim 13, wherein said glycol constitutes about 1% to about 20%, by weight of said strengthened hydrogel.

15. The method according to claim 11, wherein said gelling agent further includes a member selected from the group consisting of carrageenan, locust bean gum, starch, a cellulosic, partially- or fully-deacetylated gellan, carob gum, agar and a combination thereof.

16. The method according to claim 15, wherein said cellulosic is a member selected from the group consisting of methyl cellulose, ethyl cellulose and a combination thereof.

17. The method according to claim 11, wherein said step of returning said hydrogel mixture to ambient temperature is carried out by allowing said hydrogel mixture to cool without refrigeration means.

18. The method according to claim 11, wherein said step of returning said hydrogel to ambient temperature is aided by utilizing refrigeration means.

19. A method for strengthening a hydrogel of a naturally-occurring gelling agent, or a derivative thereof, comprising the steps of:

providing a gelling agent selected from the group consisting of xanthan gum, konjac flour and a combination thereof;

hydrating said gelling agent;

adding a glycol to said gelling agent, said glycol being a member selected from the group consisting of 1,2-propylene glycol and its ether derivatives, having only secondary alcohol groups, having a chemical structure of:

$$R^5O-CH_2-CH(CH_3)-OR^6,$$

wherein, either or both $R^5$ and $R^6$ are H or $-CH_2-CH(OH)-CH_3$, and a combination thereof, to produce a hydrogel mixture;

heating said hydrogel mixture; and, returning said hydrogel mixture to ambient temperature, thereby producing a strengthened hydrogel.

20. The method according to claim 19, wherein said gelling agent is a hydrogel precursor agent selected to achieve a gel structure appropriate for an intended use of said strengthened hydrogel.

21. The method according to claim 19, wherein said glycol constitutes about 0.1% to about 45%, by weight, or said strengthened hydrogel.

22. The method according to claim 21, wherein said glycol constitutes about 1% to about 20%, by weight, of said strengthened hydrogel.

23. The method according to claim 19, wherein said gelling agent further includes a member selected from the group consisting of carrageenan, locust bean gum, starch, a cellulosic, partially- or fully-deacetylated gellan, carob gum, agar and a combination thereof.

24. The method according to claim 23, wherein said cellulosic is a member selected from the group consisting of methyl cellulose, ethyl cellulose and a combination thereof.

* * * * *